Patented Jan. 26, 1954

2,667,418

UNITED STATES PATENT OFFICE 2,667,418

HARD BUTTER COMPOSITION

George Barsky, New York, N. Y., and George Zinzalian, Boonton, N. J., assignors to E. F. Drew & Co., Inc., New York, N. Y., a corporation of Delaware No Drawing. Application February 10, 1951, Serial No. 210,436

6 Claims. (Cl. 99—118)

The present invention is directed to fatty edible compositions, more particularly to a fat which is of the nature of a hard butter, and adapted for use in various edible products in the form of icings, coatings, in candies and the like.

In Patent No. 2,238,441, dated April 15, 1941, entitled "Compositions Containing Glycerol Esters" there has been described the making of a hard butter from mixed fatty acids of a coconut type oil wherein said acids were fractionated and the higher fraction which contained the bulk of the fatty acids having 12 to 18 carbon atoms was esterified with glycerine to give a substantially neutral triglyceride product. This product constitutes a hard butter adapted for use in coatings and icings but it was found in commercial operation that there were variations in the properties of the product. It is essential in a hard butter that the product have a resistance to softening at summer temperatures but be readily fusible in the mouth to form a free-flowing liquid. The products of the patent did not always have the uniform softening and melting temperatures required by the trade. In some cases the hard butter had a waxy consistency, sometimes was greasy to the touch and the texture was not always smooth.

The present invention is intended and adapted to overcome the difficulties and disadvantages inherent in products of the type described in the above mentioned patent, it being among the objects of the present invention to provide a hard butter which may be readily incorporated into various edible compositions and used for icings, coatings, etc.

It is also among the objects of the present invention to provide a hard butter composition which will not soften or become sticky or flow at ordinary summer temperatures but which melts readily in the mouth to form a free-flowing liquid.

It is further among the objects of the present invention to provide a hard butter which has a smooth texture, is capable of imparting such texture to compositions in which it is incorporated, and which is substantially free from waxiness, greasiness and chewiness.

It is still further among the objects of the present invention to provide a composition of fatty acids in the form of mixed substantially neutral triglycerides wherein the ratio of acids is balanced in order to obtain the desired results.

In practicing the present invention there is provided a mixture of fatty acids which is preferably derived from a coconut type oil such as coconut oil, babassu oil and palm kernel oil. The principal acids in the composition are lauric and myristic acids, the total amount thereof being from 60% to 80% of the entire fatty acid composition. The remainder consists of both higher and lower fatty acids in a definite ratio or balance. The relative amounts of lauric and myristic acids are such that there is at least two times the weight of lauric as myristic acid.

There should be present a relatively small amount of the lower fatty acids of a coconut type oil, these acids being capric and caprylic, the amount thereof being not more than 2.5% and as low as 1%. Substantially no caproic acid is usually present.

The higher fatty acids in the final product are principally palmitic and stearic, the amount of palmitic being not over about 13%. Oleic and linoleic acid present in the original fraction of distilled fatty acids are transformed into stearic acid by hydrogenation to the extent that in the end product the amount of oleic acid is not over .2%.

In general, the fatty acid composition which is used in making of the hard butter has the following proportions of fatty acids:

| | Per cent |
|---|---|
| Capric and caprylic | >2.5 |
| Lauric | 44–57 |
| Myristic | 16–23 |
| Palmitic | 10–13 |
| Stearic | 2–4 |
| Oleic and linoleic | 7–24 |

The relative proportions of the various fatty acids in the starting material may vary considerably within the limits set forth and the following are typical examples of three compositions which are adapted to form satisfactory hard butters.

| | | | |
|---|---|---|---|
| Caprylic | .7 | 0.5 | |
| Capric | 1.7 | 1.5 | 1.2 |
| Lauric | 47.7 | 45.0 | 56.1 |
| Myristic | 19.5 | 17.0 | 20.5 |
| Palmitic | 12.3 | 11.0 | 10.6 |
| Stearic | 2.5 | 2.0 | 2.3 |
| Oleic and linoleic | 15.6 | 23.0 | 9.3 |

Such a mixture of fatty acids has the following characteristics:

| | |
|---|---|
| F. F. A. | 124–128 |
| I. V. | 16–20 |
| Sap. value | 246–256 |

The mixture of fatty acids is placed in a reaction vessel, mixed with a sufficient amount of glycerine and esterified in accordance with the process set forth in co-pending application Serial No. 210,435, filed February 10, 1951, entitled "Method of Making Hard Butter." The crude ester may then be refined as usual, bleached and then hydrogenated to a point where the amount of unsaturated fatty acids, namely, oleic, has been reduced to as low as .5%. If desired, the hydrogenated product may again be subjected to a refining operation and then deodorized.

The final product contains the fatty acids in esterified form, the analysis of said fatty acids in the hard butter being as follows:

| | Per cent |
|---|---|
| Capric and caprylic | >2.5 |
| Lauric | 44–57 |
| Myristic | 16–23 |
| Palmitic and stearic | 19–41 |
| Oleic | >.5 |

The melting points of the several lauric-myristic triglycerides varies from about 43.8° to 50° C., all well above body temperature. The presence of higher fatty acids in combination, such as palmitic and stearic, would normally increase the melting point and thus further interfere with the desired properties. We have discovered, however, that with the above composition of fatty acids the random distribution of the fatty acids in the glycerides, results in a lower melting combination. The above proportions of mixed acids results in a product in which waxiness and chewiness are practically absent. The palmitic and stearic acids in the form of esters tends to increase the waxiness of the product if too much is present and, therefore, the amount is limited to the stated proportions. Oleic acid in the final glycerides tends to unduly soften them so as to allow compositions made with such a hard butter to soften under summer temperatures. For this reason, the oleic acid content is kept extremely low.

It seems desirable to balance to a certain extent the higher melting point imparted by the palmitic and stearic acid in the triglycerides by a specified small amount of capric and caprylic acids. The relative proportions of these lower acids to the palmitic and stearic acids must be such that there is a balance between the low and the high melting properties imparted by these two classes of fatty acids. It has been found that the capric and caprylic acids must be limited to not over 2.5% so as to avoid greasiness in the final product and when the aforesaid higher acids are present in such proportions, they balance the lower acids.

There are many mixed esters in the hard butter and it is believed that only a very small proportion of the esters present are simple triglycerides. As a result, there appears to be formed a "eutectic" mixture of mixed triglycerides whereby a homogeneous mutual solution is obtained which has little tendency to crystallize. When the fatty acids are present in the above stated proportions, the various characteristics of the final product come within the range found desirable in the trade. The following are the characteristics of acceptable hard butters made in accordance with the present invention:

| | | | | |
|---|---|---|---|---|
| M. P. Wiley | °F | 116–118 | 112–114 | 101–103 |
| Setting Point, Min | °C | 33.0 | 32.0 | 30.5 |
| Incipient Fusion, Min | °F | 92.0 | 91.0 | 89.5 |
| MP closed capillary | °F | 120–122 | 120–122 | 103–104 |
| Col. Max. (Lovibond Red 5¼" col.) | | 3.5 | 3.5 | 3.5 |
| F. F. A. Max. (as oleic) | percent | 0.1 | 0.1 | 0.1 |

Although the invention has been described setting forth several specific embodiments thereof, such examples are intended to illustrate the invention and not to limit it as various changes in the details thereof may be made within the principles herein set forth. For instance, the mixture of fatty acids may be derived from other sources than the coconut type oil, at least in part. Stearic and palmitic acids may be added in part in the form of triglycerides in the later stages of the operation or may be added as free acids at the beginning of the esterification. There may also be added to the final hard butter a relatively small amount of lecithin, usually about .25%. The starting composition need not contain large amounts of unsaturated fatty acids but if they are substantially absent in the mixed fatty acids, hydrogenation of the final product may be avoided.

We claim:

1. Hard butter consisting essentially of the substantially neutral unhydrogenated mixed glyceride esters of a mixture of fatty acids having about the following composition:

| | Per cent |
|---|---|
| Capric and caprylic | 1–2.5 |
| Lauric | 44–57 |
| Myristic | 16–23 |
| Palmitic | 10–13 |
| Stearic | 2–4 |
| Oleic and linoleic | 7–24 |

2. Hard butter according to claim 1 in which said acids have an I. V. of 16–20 and an F. F. A. of 124–128.

3. Hard butter according to claim 1 in which the product is hydrogenated to an I. V. of less than 1.

4. Hard butter consisting essentially of the substantially neutral hydrogenated mixed glyceride esters of a mixture of fatty acids having about the following composition:

| | Per cent |
|---|---|
| Capric and caprylic | 1–2.5 |
| Lauric | 44–57 |
| Myristic | 16–23 |
| Palmitic and stearic | 19–41 |
| Oleic | >.5 |

5. Hard butter according to claim 4 in which the melting point is about 100°–120° F.

6. Hard butter according to claim 4 in which the melting point is about 100°–120° F. and an F. F. A. of less than 0.1%.

GEORGE BARSKY.
GEORGE ZINZALIAN.

References Cited in the file of this patent

UNITED STATES PATENTS

| Number | Name | Date |
|---|---|---|
| 2,238,441 | Drew | Apr. 15, 1941 |